W. A. BUCKNER.
LOCK NUT.
APPLICATION FILED MAR. 14, 1916.

1,213,071.

Patented Jan. 16, 1917.

Witnesses
Hugh H. Ott

Inventor
W. A. Buckner
By Victor J. Evans
Attorney

UNITED STATES PATENT OFFICE.

WILLIAM A. BUCKNER, OF FRESNO, CALIFORNIA.

LOCK-NUT.

1,213,071.  Specification of Letters Patent.  Patented Jan. 16, 1917.

Application filed March 14, 1916.  Serial No. 84,187.

*To all whom it may concern:*

Be it known that I, WILLIAM A. BUCKNER, a citizen of the United States, residing at Fresno, in the county of Fresno and State of California, have invented new and useful Improvements in Lock-Nuts, of which the following is a specification.

The present invention relates to improvements in means for locking a nut upon a bolt.

In carrying out my invention it is my purpose to produce a lock nut which is so constructed and arranged as to engage with the nut proper as to lock the same at any desired position upon a bolt.

It is also my aim to produce a nut locking means wherein the nut screwed upon the bolt will have its outer face serrated or otherwise formed with teeth and to provide a locking nut which has its inner face arranged at an angle and its thickened side or corner integrally formed with a tooth which when threaded upon the bolt will ratchet over the teeth of the first mentioned nut until brought into tight engagement with the said nut when the locking nut will be tilted or canted over the ordinary nut to compress the threads of both the ordinary nut and the lock nut against the threads of the bolt and so effectively lock the nut upon the bolt.

It is a still further object of the invention to produce an effective nut locking means which shall embody the desirable features of simplicity, cheapness and thorough efficiency.

With the foregoing objects in view, the improvement resides in the construction, combination and arrangement of parts set forth in the following specification and falling within the scope of the appended claim.

Figure 1:
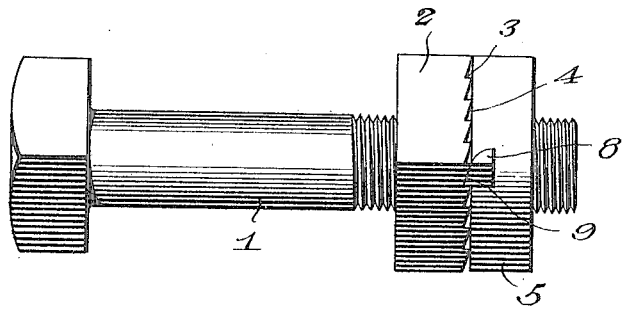
Figure 3:
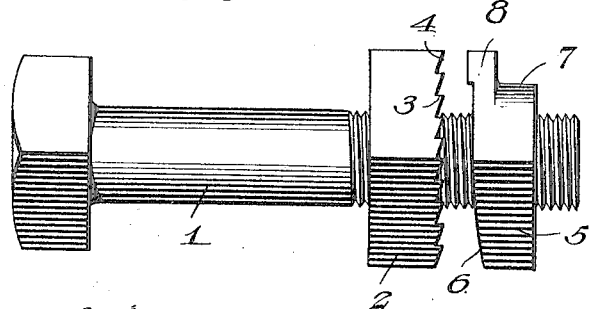
Figure 2:
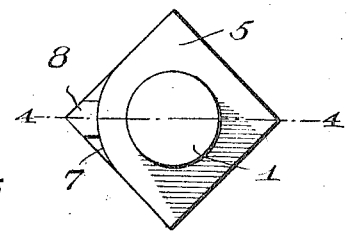
Figure 4:
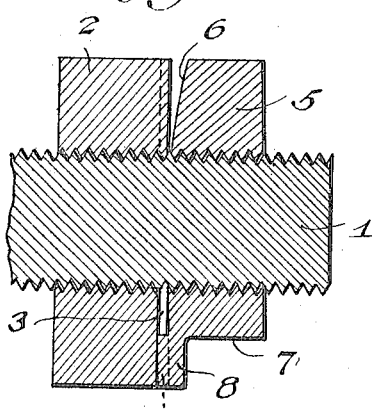
Figure 5:
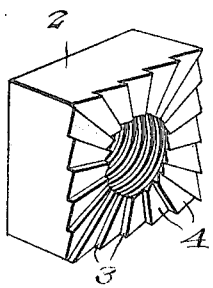
Figure 6:
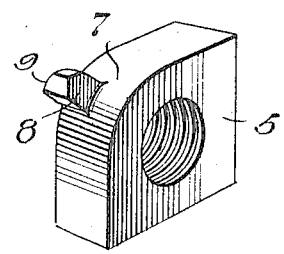

In the drawing: Figure 1 is a side elevation of a bolt having a nut locked thereon, Fig. 2 is an end elevation of the same, Fig. 3 is a side elevation showing the arrangement of the locking element before the same is screwed on the bolt to be brought into tight engagement with the nut, Fig. 4 is a sectional view approximately on the line 4—4 of Fig. 2, Fig. 5 is a perspective view of the nut looking toward the outer face thereof, and Fig. 6 is a similar view of the locking member.

In the drawing, the numeral 1 designates a bolt and 2 a nut which is screwed upon the bolt. The nut in the present instance has its outer face radially depressed to provide the same with straight shoulders 3 and angular walls 4 connecting the shoulders.

The locking element is indicated by the numeral 5 and comprises a nut member which has its inner face beveled from one of its sides or corners to its diametrically opposite side or corner, the said beveled face being indicated by the numeral 6. The locking member at the thicker end or corner thereof is preferably cut away as indicated by the numeral 7, and the said surface is formed with an extending finger or tooth 8. One of the corners of this tooth at the lower portion thereof is inclined or beveled, as at 9, and the lower surface of the tooth is arranged in a line with the angular or inner beveled face of the locking member. The beveled or cut away corner of the tooth permits of the same ratcheting over the teeth or shoulders of the nut 2 until after the same has been brought into tight engagement with the nut, and such engagement will cause both the locking member and the nut to be canted or swung to bring their threads into tight frictional contact with the threads of the bolt 1 and thus effectively secure both the nut 2 and the locking member upon the bolt, for the reason that neither nut can be turned independent of the other and the two nuts cannot be turned together for the further reason that in so doing they cross threads with the bolt. If sufficient pressure is brought to bear upon the locking member the threads of the nut as well as the threads in the bore of the locking member and the threads in the bore of the nut 2 may become distorted, but in ordinary use the frictional engagement between the threads of the nut, the locking member and the bolt are sufficient to lock the nut and the locking member upon the bolt without injury to the threads of the bolt. The cut away corner or surface of the nut permits of a file being arranged in a line therewith so that the tooth may be easily severed if desired or the said tooth may be cut from the locking member by a blow upon an ordinary cold chisel or the like.

Having thus described the invention, what I claim is:

The combination with a bolt and a nut screwed on the bolt, said nut having its outer face depressed to provide straight shoulders and angular walls connecting the shoulders, of a locking nut also screwed upon the bolt, said locking nut having its inner face arranged at an angle with respect to its outer face, the thickened side or corner of the locking nut being cut away but being formed with a longitudinally extending tooth which has its inner edge project slightly beyond the angular inner face of the locking nut and which has its engaging face angular, the said tooth adapted to ratchet over the teeth of the first mentioned nut until the locking nut is brought into frictional contact with the said nut, and then cause both the nut and the locking nut to cant toward each other to compress their threads against the threads of the bolt, thereby tending to close the threads and preventing any loosening of the nuts.

In testimony whereof I affix my signature in presence of two witnesses.

WILLIAM A. BUCKNER.

Witnesses:
ELMER T. WEST,
V. J. IMHOFF.

Copies of this patent may be obtained for five cents each, by addressing the "Commissioner of Patents, Washington, D. C."